United States Patent
Suzuki

(10) Patent No.: US 11,686,958 B2
(45) Date of Patent: Jun. 27, 2023

(54) MAGNETO-OPTIC ELEMENT AND METHOD FOR PRODUCING SAME

(71) Applicant: NIPPON ELECTRIC GLASS CO., LTD., Otsu (JP)

(72) Inventor: Futoshi Suzuki, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 700 days.

(21) Appl. No.: 16/335,692

(22) PCT Filed: Sep. 7, 2017

(86) PCT No.: PCT/JP2017/032272
§ 371 (c)(1),
(2) Date: Mar. 22, 2019

(87) PCT Pub. No.: WO2018/079090
PCT Pub. Date: May 3, 2018

(65) Prior Publication Data
US 2020/0033647 A1    Jan. 30, 2020

(30) Foreign Application Priority Data

Oct. 24, 2016  (JP) .................. 2016-207864

(51) Int. Cl.
| | | |
|---|---|---|
| *G02F 1/09* | (2006.01) | |
| *G02F 1/01* | (2006.01) | |
| *C03B 23/203* | (2006.01) | |
| *C03B 23/207* | (2006.01) | |
| *C03C 3/068* | (2006.01) | |

(Continued)

(52) U.S. Cl.
CPC .............. *G02F 1/09* (2013.01); *C03B 23/203* (2013.01); *C03B 23/207* (2013.01); *C03C 3/068* (2013.01); *C03C 3/15* (2013.01); *C03C 4/00* (2013.01); *G02F 1/0136* (2013.01); *G02F 2202/09* (2013.01)

(58) Field of Classification Search
CPC ...... G02F 1/09; G02F 1/0136; G02F 2202/09; C03B 23/203; C03B 23/207; C03C 3/068; C03C 3/15
See application file for complete search history.

(56) References Cited

U.S. PATENT DOCUMENTS

| | | |
|---|---|---|
| 3,971,723 A | 7/1976 | Tajima et al. |
| 5,808,793 A | 9/1998 | Chang et al. |

(Continued)

FOREIGN PATENT DOCUMENTS

| | | |
|---|---|---|
| CN | 1519614 A | 8/2004 |
| CN | 102627404 A | 8/2012 |

(Continued)

OTHER PUBLICATIONS

Official Communication issued in International Patent Application No. PCT/JP2017/032272, dated Dec. 5, 2017. No Translation.

(Continued)

*Primary Examiner* — Jack Dinh
(74) *Attorney, Agent, or Firm* — Keating and Bennett, LLP

(57) ABSTRACT

Provided is a magneto-optic element that enables easy size reduction of an optical isolator. A magneto-optic element is formed of two or more magnetic members joined together.

5 Claims, 2 Drawing Sheets

(51) Int. Cl.
*C03C 3/15* (2006.01)
*C03C 4/00* (2006.01)

(56) References Cited

U.S. PATENT DOCUMENTS

| | | |
|---|---|---|
| 2004/0174598 A1 | 9/2004 | Shoda et al. |
| 2017/0226002 A1 | 8/2017 | Suzuki |
| 2018/0002220 A1 | 1/2018 | Suzuki |

FOREIGN PATENT DOCUMENTS

| | | | |
|---|---|---|---|
| CN | 102745901 B | * | 7/2014 |
| CN | 104656287 A | | 5/2015 |
| JP | 51-046524 B2 | | 12/1976 |
| JP | 52-032881 B2 | | 8/1977 |
| JP | 55-042942 B2 | | 11/1980 |
| JP | 61-105525 A | | 5/1986 |
| JP | 10-297933 A | | 11/1998 |
| JP | 2000-284226 A | | 10/2000 |
| JP | 2016-155740 A | | 9/2016 |
| WO | 2016/121655 A1 | | 8/2016 |

OTHER PUBLICATIONS

Hayakawa et al., "Manganese-Doping Effects on Magneto-Optical Properties of Terbium Borate Glass", Journal of the Ceramic Society of Japan, vol. 110, No. 11, 2002, pp. 970-974.

Hayakawa et al., "Faraday Rotation Effect of Highly Tb2O3/Dy2O3-Concentrated B2O3—Ga2O3—SiO2—P2O5 Glasses", Chemistry of Materials, vol. 14, 2002, pp. 3223-3225.

Tanaka et al., "Large Verdet Constant of 30Tb2O3·70B2O3 Glass", Japanese Journal of Applied Physics, vol. 34, Part 1, No. 9A, Sep. 1995, 3 pages.

Official Communication issued in corresponding Chinese Patent Application No. 201780065230.8, dated Aug. 3, 2021.

* cited by examiner

[FIG. 1]
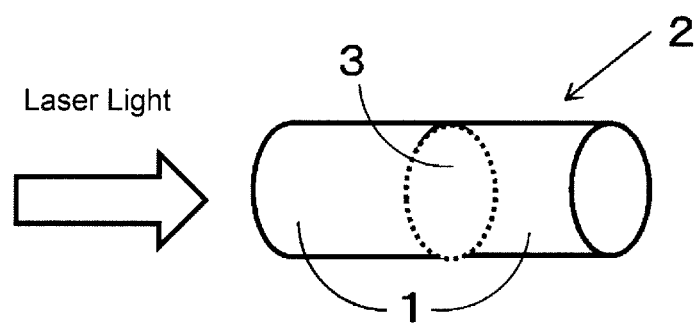
[FIG. 2]
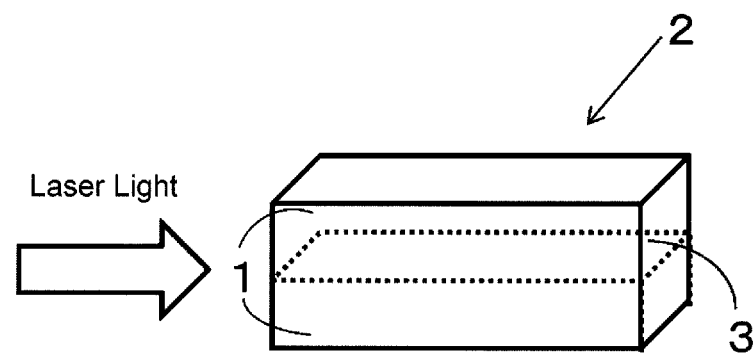

[FIG. 3]
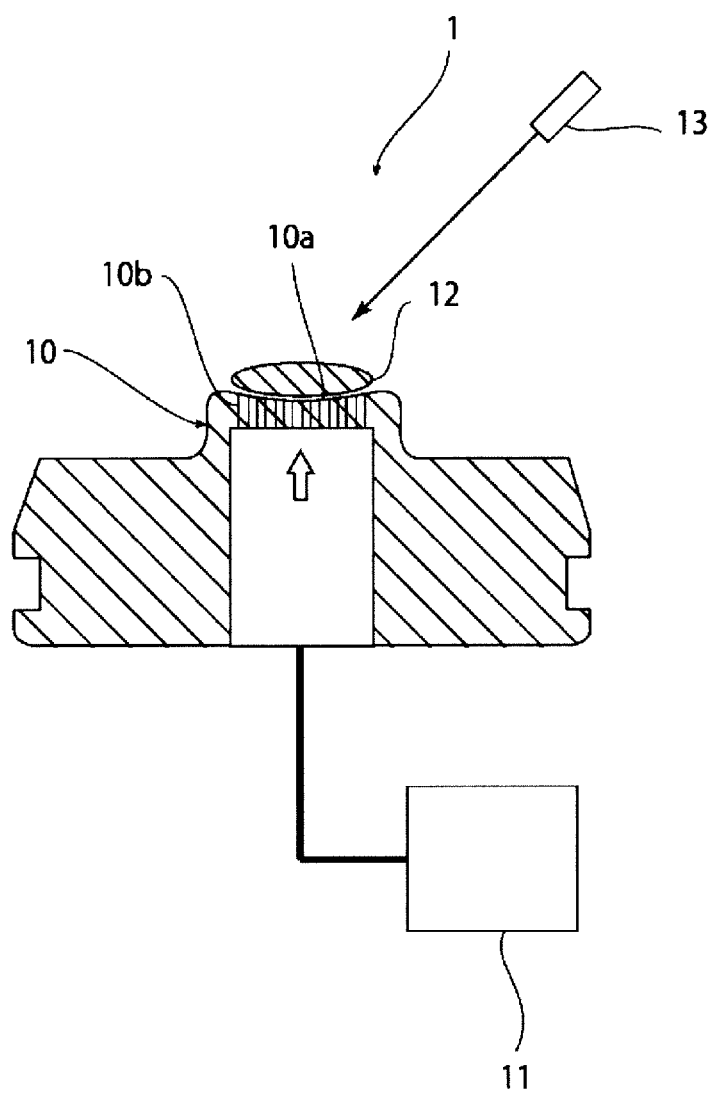

MAGNETO-OPTIC ELEMENT AND METHOD FOR PRODUCING SAME

TECHNICAL FIELD

The present invention relates to a magneto-optic element suitable for a magnetic device, such as an optical isolator, an optical circulator or a magnetic sensor, and a method for producing the same.

BACKGROUND ART

A glass material containing a paramagnetic compound, such as $Tb_2O_3$, is known to exhibit the Faraday effect which is one of magneto-optic effects. The Faraday effect is an effect of rotating the polarization plane of linearly polarized light passing through a material placed in a magnetic field. This effect is utilized in optical isolators, magnetic field sensors, and so on.

The optical rotation θ (angle of rotation of the polarization plane) due to the Faraday effect is expressed by the formula below where the intensity of a magnetic field is represented by H and the length of an element through which polarized light passes is represented by L. In the formula, V represents a constant dependent on the type of a substance and is referred to as a Verdet constant. The Verdet constant takes positive values for diamagnetic substances and takes negative values for paramagnetic substances. The larger the absolute value of the Verdet constant, or the longer the element, or the more the magnet size is increased (the more the magnetic field is strengthened), the larger the absolute value of the optical rotation, resulting in exhibition of greater Faraday effect. In order to reduce the size of an optical isolator, the use of a material having a large Verdet constant is the most effective.

$$\theta = VHL$$

Conventionally known glass materials exhibiting the Faraday effect include $SiO_2$-$B_2O_3$-$Al_2O_3$-$Tb_2O_3$-based glass materials (see Patent Literature 1), $P_2O_5$-$B_2O_3$-$Tb_2O_3$-based glass materials (see Patent Literature 2), and $P_2O_5$—$TbF_3$—$RF_2$— (where R represents an alkaline earth metal) based glass materials (see Patent Literature 3).

CITATION LIST

Patent Literature

[PTL 1]
Examined Japanese Patent Application Publication No. S51-46524
[PTL 2]
Examined Japanese Patent Application Publication No. S52-32881
[PTL 3]
Examined Japanese Patent Application Publication No. S55-42942

SUMMARY OF INVENTION

Technical Problem

The above glass material can be obtained as a material having a large Verdet constant by increasing the content of a paramagnetic compound. However, vitrification becomes difficult correspondingly, which makes it possible to provide only a very small glass member. Eventually, in order to achieve a desired Faraday effect, it is necessary to increase the magnet size (strengthen the magnetic field), which contrariwise increases the size of the optical isolator.

In view of the foregoing, an object of the present invention is to provide a magneto-optic element that enables easy size reduction of an optical isolator.

Solution to Problem

A magneto-optic element according to the present invention is formed of two or more magnetic members joined together. The joining of two or more magnetic members makes it easy to obtain a large magneto-optic element. Therefore, the magneto-optic element according to the present invention can have a necessary length to obtain a large Faraday effect, for example, even if a less vitrifiable glass material is used for magnetic members. Thus, the magnet can be reduced in size, which enables easy size reduction of an optical isolator.

In the magneto-optic element according to the present invention, the magnetic members are preferably glass members.

In the magneto-optic element according to the present invention, the glass members are preferably fusion-joined to each other.

In the magneto-optic element according to the present invention, the glass members preferably contain, in % by mass, 78% or more $Tb_2O_3$ in a composition thereof. Because the glass members contain $Tb_2O_3$ in large amounts as described above, the absolute value of the Verdet constant becomes large. As a result, the magneto-optic element exhibits a large Faraday effect.

The magneto-optic element according to the present invention can be used as a Faraday rotator. The use for the above application enables the magneto-optic element to be given the effect of the present invention.

A method for producing a magneto-optic element according to the present invention includes fusion joining two or more glass members together by application of heat.

In the method for producing a magneto-optic element according to the present invention, a temperature for fusion joining the two or more glass members is preferably from (glass transition point minus 20° C.) to (glass transition point plus 100° C.)

Advantageous Effects of Invention

The present invention enables provision of a magneto-optic element that allows easy size reduction of an optical isolator.

BRIEF DESCRIPTION OF DRAWINGS

FIG. 1 is a schematic perspective view showing a magneto-optic element according to a first embodiment of the present invention.

FIG. 2 is a schematic perspective view showing a magneto-optic element according to a second embodiment of the present invention.

FIG. 3 is a schematic cross-sectional view showing an embodiment of an apparatus for producing a glass member for use in the present invention.

DESCRIPTION OF EMBODIMENTS

Hereinafter, a description will be given of embodiments of the present invention.

(1) First Embodiment

FIG. 1 is a schematic perspective view showing a magneto-optic element according to a first embodiment of the present invention.

In a magneto-optic element 2 in this embodiment, two glass members 1 as magnetic members are joined together in tandem along a length direction so that joint surfaces 3 of the two glass members 1 are perpendicular to a direction of travel of laser light. The number of glass members 1 need only be two or more and no particular limitation is placed on the upper limit thereof. In order to efficiently apply a magnetic field to the magneto-optic element 2, the glass members 1 preferably have a cylindrical shape. Such a magneto-optic element 2 can have a necessary length, is therefore likely to exhibit a large Faraday effect, and enables easy size reduction of an optical isolator.

Next, a description will be given of a method for producing the magneto-optic element according to the first embodiment of the present invention.

First, glass members 1 are processed in a cylindrical shape and their end surfaces serving as joint surfaces 3 are polished to a mirror finish. Thereafter, the glass members 1 are abutted at the joint surfaces 3 and undergo a heat treatment while being subjected to a load, so that the glass members 1 can be fusion-joined.

Next, a detailed description will be given of conditions for the heat treatment. The heat treatment temperature is preferably from the glass transition point minus 20° C. to the glass transition point plus 100° C., more preferably from the glass transition point minus 10° C. to the glass transition point plus 90° C., still more preferably from the glass transition point to the glass transition point plus 80° C., and even still more preferably from the glass transition point to the glass transition point plus 60° C. If the heat treatment temperature is too low, the glass members 2 are less likely to be joined together. On the other hand, if the heat treatment temperature is too high, the glass members 2 are likely to devitrify. The load is preferably 0.05 kgf to 1 kgf and more preferably 0.1 kgf to 0.9 kgf. If the load is too light, the glass members 2 are less likely to be joined together. On the other hand, if the load is too heavy, the glass members 2 are likely to break. No particular limitation is placed on the atmosphere during the heat treatment, but an inert atmosphere is preferred for $Tb_2O_3$-based glasses. The inert atmosphere may be any one of nitrogen, argon, and helium atmospheres, but a nitrogen atmosphere is particularly preferred because it is inexpensive. If the heat treatment is done without control over the atmosphere, i.e., if the heat treatment is done in the air, the glass is oxidized to increase the amount of $Tb^{4+}$ whose magnetic moment leading to the Verdet constant is low, so that the Faraday effect is likely to be low.

(2) Second Embodiment

FIG. 2 is a schematic perspective view showing a magneto-optic element according to a second embodiment of the present invention.

In a magneto-optic element 2 in this embodiment, two glass members 1 as magnetic members are joined together in parallel along a length direction so that joint surfaces of the two glass members 1 are parallel to a direction of travel of laser light. The number of glass members 1 need only be two or more and no particular limitation is placed on the upper limit thereof. Such a magneto-optic element 2 can have a large cross-sectional area and can therefore be easily used in an optical isolator that supports laser having a large laser diameter.

Next, a description will be given of a method for producing the magneto-optic element according to the second embodiment of the present invention.

First, glass members 1 are processed in a sheet-like shape and their joint surfaces 3 are polished to a mirror finish. Thereafter, the glass members 1 are abutted at the joint surfaces 3 and undergo a heat treatment while being subjected to a load, so that the glass members 1 can be fusion-joined. After the joining, the magneto-optic element 2 maybe processed in a desired shape, such as a cylindrical shape. The heat treatment temperature, the load, and the conditions during the heat treatment are the same as in the first embodiment.

It is also possible to join three or more glass members to further increase the length of the magneto-optic element, further increase the cross-sectional area thereof or increase both the length and cross-sectional area thereof. Furthermore, the glass members may be joined together by optical contact.

The glass members preferably have substantially the same composition. By doing so, the physical properties of the magneto-optic element can be homogenized.

Next, a description will be given of the glass members for use in the present invention.

The glass members for use in the present invention contain, in % by mass, preferably 78% or more $Tb_2O_3$, more preferably 79% or more $Tb_2O_3$, and still more preferably 80% or more $Tb_2O_3$. If the content of $Tb_2O_3$ is too small, the absolute value of the Verdet constant becomes small, so that a sufficient Faraday effect is less likely to be achieved. On the other hand, if the content of $Tb_2O_3$ is too large, vitrification tends to become difficult. Therefore, the content of $Tb_2O_3$ is preferably not more than 95%, more preferably not more than 92%, and particularly preferably not more than 90%.

In relation to Tb, the content of its trivalent oxide has been defined above, but, as for its oxides other than the trivalent oxide, their content when converted to the trivalent oxide is preferably in the above range.

The magnetic moment from which the Verdet constant is derived is greater in $Tb^{3+}$ than in $Tb^{4+}$. A larger percentage of $Tb^{3+}$ in the glass members is more preferable because the Faraday effect becomes larger. Specifically, the percentage of $Tb^{3+}$ in the total content of Tb is, in % by mass, preferably 50% or more, more preferably 60% or more, still more preferably 70% or more, yet more preferably 80% or more, and particularly preferably 90% or more.

The glass members for use in the present invention may contain, in addition to $Tb_2O_3$, the following various components. In the following description of the contents of components, "%" refers to "% by mass" unless otherwise specified.

$B_2O_3$ is a component for forming a main glass network and widening the vitrification range. However, this component does not contribute to increase in the Verdet constant. Therefore, if the content thereof is too large, a sufficient Faraday effect is less likely to be achieved. Hence, the content of $B_2O_3$ is preferably 0 to 22%, more preferably 1 to 21%, still more preferably 1 to 20%, yet more preferably 1 to 17%, and particularly preferably 2 to 15%.

$P_2O_5$ is a component for forming a glass network and widening the vitrification range. However, this component does not contribute to increase in the Verdet constant. Therefore, if the content thereof is too large, a sufficient Faraday effect is less likely to be achieved. Hence, the content of $P_2O_5$ is preferably 0 to 22%, more preferably 0 to 20%, still more preferably 0 to 15%, yet more preferably 0 to 12%, and particularly preferably 0 to 10% (exclusive of 0%).

$SiO_2$ is a component for forming a glass network and widening the vitrification range. However, this component does not contribute to increase in the Verdet constant. Therefore, if the content thereof is too large, a sufficient Faraday effect is less likely to be achieved. Hence, the content of $SiO_2$ is preferably 0 to 22%, more preferably 0 to 20%, still more preferably 0 to 15%, yet more preferably 0 to 12%, and particularly preferably 0 to 10% (exclusive of 0%).

Furthermore, the total amount of $SiO_2$ and $B_2O_3$ is preferably 0 to 22%, more preferably 1 to 21%, and particularly preferably 2 to 20%. The total amount of $B_2O_3$ and $P_2O_5$ is preferably 0 to 22%, more preferably 1 to 21%, and particularly preferably 2 to 20%. The total amount of $SiO_2$, $B_2O_3$, and $P_2O_5$ is preferably 0 to 22%, more preferably 1 to 21%, and particularly preferably 2 to 20%.

$Al_2O_3$ is a component for forming a glass network as an intermediate oxide and widening the vitrification range. However, $Al_2O_3$ does not contribute to increase in the Verdet constant. Therefore, if its content is too large, a sufficient Faraday effect is less likely to be achieved. Hence, the content of $Al_2O_3$ is preferably 0 to 20%, more preferably 0 to 15%, still more preferably 0 to 12% (exclusive of 0%), yet more preferably 0.1 to 10%, and particularly preferably 1 to 9%.

$La_2O_3$, $Gd_2O_3$, $Yb_2O_3$, and $Y_2O_3$ have the effect of stabilizing glass, but an excessive large content thereof contrariwise makes vitrification difficult. Therefore, the content of each of $La_2O_3$, $Gd_2O_3$, $Yb_2O_3$, and $Y_2O_3$ is preferably 10% or less and particularly preferably 5% or less.

$Dy_2O_3$, $Eu_2O_3$, and $Ce_2O_3$ stabilize glass and contributes to increase in the Verdet constant. However, an excessive large content thereof contrariwise makes vitrification difficult. Therefore, the content of each of $Dy_2O_3$, $Eu_2O_3$, and $Ce_2O_3$ is preferably 15% or less and particularly preferably 10% or less. In relation to Dy, Eu, and Ce, the contents of their trivalent oxides have been defined above, but, as for their oxides (for example, $CeO_2$) other than trivalent oxides, their contents when converted to the trivalent oxides are preferably in the above range.

MgO, CaO, SrO, and BaO have the effect of increasing the stability and chemical durability of glass. However, these components do not contribute to increase in the Verdet constant. Therefore, if the content of them is too large, a sufficient Faraday effect is less likely to be achieved. Hence, the content of each of these components is preferably 0 to 10% and particularly preferably 0 to 5%.

$Ga_2O_3$ has the effect of increasing the glass formation ability and widening the vitrification range. However, an excessive large content thereof is likely to cause devitrification. Furthermore, $Ga_2O_3$ does not contribute to increase in the Verdet constant. Therefore, if its content is too large, a sufficient Faraday effect is less likely to be achieved. Hence, the content of $Ga_2O_3$ is preferably 0 to 6% and particularly preferably 0 to 5%.

Fluorine has the effect of increasing the glass formation ability and widening the vitrification range. However, if its content is too large, fluorine volatilizes during melting, which may vary the glass composition or may have an influence on the stability of glass. Therefore, the fluorine content (in terms of $F_2$) is preferably 0 to 10%, more preferably 0 to 7%, and still more preferably 0 to 5%.

$Sb_2O_3$ may be added as a reductant. However, in order to avoid coloration or in consideration of environmental burden, the content of $Sb_2O_3$ is preferably 0.1% or less.

The magneto-optic element according to the present invention preferably has a light transmission loss as small as possible, particularly when used as a Faraday rotator, such as an isolator. Therefore, the magneto-optic element according to the present invention has a light transmittance of preferably 50% or more, more preferably 60% or more, and particularly preferably 70% or more at a wavelength of 633 nm.

The glass members for use in the present invention can be produced, for example, by a containerless levitation technique. FIG. 3 is a schematic cross-sectional view showing an example of an apparatus for producing a glass member by a containerless levitation technique. Hereinafter, a description will be given of a method for producing a glass member according to the present invention with reference to FIG. 3.

The apparatus 4 for producing a glass member includes a forming die 10. The forming die 10 also serves as a melting container. The forming die 10 includes a forming surface 10a and a plurality of gas jet holes 10b opening on the forming surface 10a. The gas jet holes 10b are connected to a gas supply mechanism 11, such as a compressed gas cylinder. Gas is supplied from this gas supply mechanism 11 via the gas jet holes 10b to the forming surface 10a. No particular limitation is placed on the type of the gas and the gas may be, for example, air or oxygen or may be nitrogen gas, argon gas, helium gas, carbon monoxide gas, carbon dioxide gas or hydrogen-containing reducing gas.

In producing a glass member using the production apparatus 4, first, a block 12 of glass raw material is placed on the forming surface 10a. Examples of the block 12 of glass raw material include a body obtained by forming raw material powders into a single piece by press forming or other processes, a sintered body obtained by forming raw material powders into a single piece by press forming or other processes and then sintering the single piece, and an aggregate of crystals having the same composition as a desired glass composition.

Next, gas is jetted out through the gas jet holes 10b, thus levitating the block 12 of glass raw material above the forming surface 10a. In other words, the block 12 of glass raw material is held out of contact with the forming surface 10a. In this state, the block 12 of glass raw material is irradiated with laser light from a laser light applicator 13. Thus, the block 12 of glass raw material is heated to melting and made vitrifiable, thus obtaining a molten glass. Thereafter, the molten glass is cooled, so that a glass member can be obtained. During the step of heating the block 12 of glass raw material to melting and the step of cooling the molten glass and in turn the glass member at least to below the softening point, at least the jetting of gas is preferably continued to restrain the contact of the block 12 of glass raw material, the molten glass, and finally the glass member with the forming surface 10a. Furthermore, the method for heating the block of glass raw material to melting may be radiation heating besides the method of irradiating it with laser light.

Besides the glass members, crystalline members, such as TGG (terbium gallium garnet), can also be used as the magnetic members.

EXAMPLES

The present invention will be described below with reference to examples but the present invention is not at all limited by the following examples.

Example 1

First, raw materials formulated to contain, in % by mass, 83% $Tb_2O_3$, 5% $Al_2O_3$, and 12% $B_2O_3$ were press-formed and sintered at 800 to 1400° C. for 12 hours, thus producing a block of glass raw material.

Next, the block of glass raw material was coarsely ground into 0.05 to 1.0 g small pieces. Using the obtained small pieces of the block of glass raw material, two approximately spherical glass members with a diameter of 8 mm were produced by a containerless levitation technique using an apparatus conforming to FIG. 3. A 100 W $CO_2$ laser oscillator was used as a heat source. Furthermore, nitrogen gas was used as a gas for levitating the block of raw material and supplied at a flow rate of 1 to 30 L/min.

The obtained two glass members were processed into cylinders with a diameter of 2.5 mm and a length of 6.75 mm and their end surfaces serving as joint surfaces were polished to a mirror finish. Next, both the glass members were abutted at their joint surfaces and then underwent a heat treatment for 10 minutes at the glass transition point (800° C.) of the glass members in a nitrogen atmosphere while being subjected to a load of 1 kgf. By the heat treatment, the glass members were joined together, thus obtaining a magneto-optic element with a diameter of 2.5 mm and a length of 13.5 mm. The obtained magneto-optic element was measured in terms of angle of Faraday rotation at a wavelength of 1064 mm in a magnetic field of 10 kOe, using a Kerr effect measuring system (manufactured by JASCO Corporation, Model K-250). The angle of Faraday rotation of the magneto-optic element was 45°.

Comparative Example 1

The glass member with a diameter of 2.5 mm and a length of 6.75 mm obtained in Example was measured in terms of angle of Faraday rotation in the same manner as in Example 1. The angle of Faraday rotation of the glass member was 22.5°, which was smaller than that in Example. In order to obtain the same angle of Faraday rotation as in Example using the above glass member, it is necessary to strengthen the magnetic field, or increase the magnet size, which makes it difficult to reduce the size of an optical isolator.

Example 2

First, raw materials formulated to contain, in % by mass, 83% $Tb_2O_3$, 4% $Al_2O_3$, 2% $SiO_2$, and 11% $B_2O_3$ were press-formed and sintered at 800 to 1400° C. for 12 hours, thus producing a block of glass raw material.

Next, the block of glass raw material was coarsely ground into 0.05 to 1.0 g small pieces. Using the obtained small pieces of the block of glass raw material, two approximately spherical glass members with a diameter of 8 mm were produced by a containerless levitation technique using an apparatus conforming to FIG. 3. A 100 W $CO_2$ laser oscillator was used as a heat source. Furthermore, nitrogen gas was used as a gas for levitating the block of raw material and supplied at a flow rate of 1 to 30 L/min.

The obtained two glass members were processed into sheets 1.5 mm thick, 3 mm wide, and 6 mm long and their plane surfaces serving as joint surfaces were polished into a mirror finish. Next, both the glass members were abutted at their joint surfaces and then underwent a heat treatment for 10 minutes at the glass transition point (805° C.) of the glass members in a nitrogen atmosphere while being subjected to a load of 1 kgf. By the heat treatment, the glass members were joined together, thus obtaining a magneto-optic element 3 mm thick, 3 mm wide, and 6 mm long. When the obtained magneto-optic element was irradiated with laser light having a diameter of 2.5 mm, a wavelength of 1064 nm, and a power of 100 W, the whole of the laser light could enter the magneto-optic element.

Comparative Example 2

When the 1.5 mm thick, 3 mm wide, and 6 mm long sheet-like glass member obtained in Example 2 was irradiated with laser light having a diameter of 2.5 mm, a wavelength of 1064 nm, and a power of 100 W, the glass member broke.

Example 3

The two glass members obtained in Example 1 were processed into cylinders with a diameter of 2.5 mm and a length of 6.75 mm and their end surfaces serving as joint surfaces were optically polished. Next, both the glass members were optically contacted at their joint surfaces. The glass members were joined together, thus obtaining a magneto-optic element with a diameter of 2.5 mm and a length of 13.5 mm. The obtained magneto-optic element was measured in terms of angle of Faraday rotation in the same manner as in Example 1. The angle of Faraday rotation of the magneto-optic element was 45°.

INDUSTRIAL APPLICABILITY

The magneto-optic element according to the present invention is suitable as a magneto-optic element making up part of a magnetic device, such as an optical isolator, an optical circulator or a magnetic sensor.

REFERENCE SIGNS LIST

1: glass member
2: magneto-optic element
3: joint surface
4: apparatus for producing a glass member
10: forming die
10a: forming surface
10b: gas jet hole
11: gas supply mechanism
12: block of glass raw material
13: laser light applicator

The invention claimed is:

1. A column-shaped magneto-optic element formed of two or more magnetic members joined together, wherein
   the two or more magnetic members are two or more glass members that are each column-shaped,
   the two or more glass members each have a joint surface, and the two or more glass members are fusion-joined to each other along the joint surfaces of the two or more glass members, and
   the two or more glass members contain, in % by mass, 78% or more $Tb_2O_3$ in a composition thereof.

2. The column-shaped magneto-optic element according to claim 1, being used as a Faraday rotator.

3. The column-shaped magneto-optic element according to claim 1, wherein the two or more glass members are joined together in tandem along a length direction so that the joint surfaces of the two or more glass members are perpendicular to a direction of travel of laser light.

4. The column-shaped magneto-optic element according to claim 1, wherein the two or more glass members are joined together in parallel along a length direction so that the joint surfaces of the two or more glass members are parallel to a direction of travel of laser light.

5. The column-shaped magneto-optic element according to claim 1, wherein the two or more glass members have a cylindrical shape.

* * * * *